(12) United States Patent
Seo et al.

(10) Patent No.: US 10,378,890 B2
(45) Date of Patent: Aug. 13, 2019

(54) APPARATUS AND METHOD FOR DETERMINING WHEEL ALIGNMENT CHANGE OF VEHICLE

(71) Applicant: HYUNDAI MOBIS CO., LTD., Seoul (KR)

(72) Inventors: Kyungil Seo, Yongin-si (KR); Jun Yung Lee, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 194 days.

(21) Appl. No.: 15/625,756

(22) Filed: Jun. 16, 2017

(65) Prior Publication Data

US 2018/0023951 A1    Jan. 25, 2018

(30) Foreign Application Priority Data

Jul. 20, 2016 (KR) .......................... 10-2016-0091868

(51) Int. Cl.
*G01B 11/275* (2006.01)
*G05D 1/00* (2006.01)
*B60W 30/12* (2006.01)

(52) U.S. Cl.
CPC .......... *G01B 11/275* (2013.01); *B60W 30/12* (2013.01); *G05D 1/0061* (2013.01); *G01B 2210/10* (2013.01)

(58) Field of Classification Search
CPC .... G01B 11/275; G05D 1/0061; B60W 30/12
USPC .......................... 33/203.18; 180/168; 701/43
See application file for complete search history.

(56) References Cited

U.S. PATENT DOCUMENTS

| | | | |
|---|---|---|---|
| 6,922,620 B2* | 7/2005 | Augustine | B60R 25/02 180/411 |
| 2004/0016870 A1* | 1/2004 | Pawlicki | B60W 30/18 250/208.1 |
| 2004/0254696 A1* | 12/2004 | Foerstner | B60T 8/885 701/31.7 |
| 2006/0217861 A1* | 9/2006 | Ihara | B62D 15/029 701/41 |
| 2008/0066994 A1* | 3/2008 | Fujita | B62D 5/0463 180/446 |

(Continued)

FOREIGN PATENT DOCUMENTS

KR   10-2001-0001849 A   1/2001

*Primary Examiner* — Christopher W Fulton
(74) *Attorney, Agent, or Firm* — Knobbe Martens Olson & Bear LLP

(57) ABSTRACT

An apparatus for determining a wheel alignment change of a vehicle may include: a straight driving situation detection unit configured to detect whether a vehicle is going straight, based on information on positions of objects on a road and a yaw rate and steering angle; a wheel alignment change detection unit configured to detect a wheel alignment change based on lane information acquired from a camera sensor of the vehicle, when the vehicle information detected by the straight driving situation detection unit indicates that the vehicle is going straight; a driver alarming unit configured to output an alarm to a driver when the detected wheel alignment change is larger than a preset threshold value; and a wheel alignment change compensation unit configured to compensate for steering for SCC or LKAS control, when the detected wheel alignment change is smaller than the threshold value.

8 Claims, 5 Drawing Sheets

(56) References Cited

U.S. PATENT DOCUMENTS

| | | | | |
|---|---|---|---|---|
| 2009/0048738 | A1* | 2/2009 | Iwazaki | B62D 1/28 |
| | | | | 701/44 |
| 2009/0076673 | A1* | 3/2009 | Brabec | A01B 69/008 |
| | | | | 701/23 |
| 2012/0057757 | A1* | 3/2012 | Oyama | G06K 9/00798 |
| | | | | 382/104 |
| 2015/0360715 | A1* | 12/2015 | Shimizu | B62D 5/001 |
| | | | | 701/43 |
| 2016/0114812 | A1* | 4/2016 | Maruyama | B60W 50/082 |
| | | | | 701/23 |
| 2016/0272202 | A1* | 9/2016 | Inomata | B62D 5/0481 |
| 2017/0166206 | A1* | 6/2017 | Lim | B60W 30/12 |
| 2018/0088573 | A1* | 3/2018 | Watanabe | G08B 6/00 |

* cited by examiner

APPARATUS AND METHOD FOR DETERMINING WHEEL ALIGNMENT CHANGE OF VEHICLE

CROSS-REFERENCES TO RELATED APPLICATIONS

The present application claims priority to Korean application number 10-2016-0091868, filed on Jul. 20, 2016, which is incorporated by reference in its entirety.

BACKGROUND OF THE INVENTION

The present invention relates to an apparatus and, method for determining a wheel alignment change in a vehicle, and more particularly, to an apparatus and method for determining a wheel alignment change of a vehicle, which determines a wheel alignment change of the vehicle using an environmental sensor mounted in SCC (Smart Cruise Control) or LKAS (Lane Keep Assist System) without mounting an additional sensor in the vehicle, and performs correction or forcibly stops the system, thereby securing the stability of the vehicle.

In general, SCC or LKAS represents a system that prevents a lane departure which may be caused by a driver's carelessness (for example, sleepiness), while following the vehicle in front using various sensors such as a millimeter-wave radar and vision sensor. Currently, the systems are mass-produced by many automakers.

In the above-described systems (for example, SCC, ACCS (Adaptive Cruise Control System) and LKAS), however, a controller controls steering, driving and braking of the vehicle without a driver's operation. Thus, when the controller is operated while the state of the vehicle is not normal, the controller may cause a malfunction or sensitive operation. In this case, an accident is highly likely to occur.

Therefore, the automakers need to specify various conditions (for example, conditions on whether the wheel alignment is adjusted, recommended tires are mounted, and the required tire pressure is observed) in an owner's manual. The conditions need to be checked before the systems (for example, SCC, ACCS and LKAS) are operated. The systems necessarily have a function of checking and correcting a deviation or abnormality of an environmental sensor (for example, radar or camera) which is required for control.

At this time, in order to guarantee normal operations of the systems (for example, SCC, ACCS and LKAS), it is very important to determine whether the vehicle is normally operated. In particular, it is important to determine whether the wheel alignment is adjusted. The wheel alignment can be checked through professional equipment in an auto mechanic's shop, but the systems cannot check a wheel alignment change by themselves. Therefore, the performance of the systems may be degraded in a vehicle of which the wheels are out of alignment.

The related art is disclosed in Korean Patent Publication No. 10-2001-0001849 published on Jan. 5, 2001 and entitled "Device and method for alarming wheel alignment change of car".

SUMMARY OF THE INVENTION

Embodiments of the present invention are directed to an apparatus and method for determining a wheel alignment change of a vehicle, which determines a wheel alignment change of the vehicle using an environmental sensor mounted in SCC or LKAS without mounting an additional sensor in the vehicle, and performs correction or forcibly stops the system, thereby securing the stability of the vehicle.

In one embodiment, an apparatus for determining a wheel alignment change of a vehicle may include: a straight driving situation detection unit configured to detect whether a vehicle is going straight, based on information on positions of objects on a road, acquired from a radar sensor of the vehicle, and a yaw rate and steering angle acquired from a vehicle sensor mounted in the vehicle; a wheel alignment change detection unit configured to detect a wheel alignment change based on lane information acquired from a camera sensor of the vehicle, when the vehicle information detected by the straight driving situation detection unit indicates that the vehicle is going straight; a driver alarming unit configured to output an alarm to a driver when the detected wheel alignment change is larger than a preset threshold value; and a wheel alignment change compensation unit configured to compensate for steering for SCC or LKAS control, when the detected wheel alignment change is smaller than the threshold value.

The vehicle sensor may include a steering angle sensor and a yaw rate sensor.

The straight driving situation detection unit and the wheel alignment change detection unit may be integrated into a control unit, and the control unit may verify whether the state of the yaw rate sensor is normal, by determining whether the road on which the vehicle is traveling is a straight road or curved road, using surrounding object arrangement information acquired from the radar sensor.

When the wheel alignment change is equal to or less than the threshold value, the control unit may compensate for steering by the wheel alignment change through the wheel alignment change compensation unit, and output the compensation result to a vehicle actuator. When the wheel alignment change exceeds the threshold value, the control unit may output a wheel alignment change threshold exceeding signal to the driver alarming unit to alarm the driver, or forcibly stop the SCC or LKAS operation or forbid an entry of the SCC or LKAS.

When a wheel alignment change is likely to occur in the corresponding mode among an active mode of the LKAS, a passive mode of the LKAS and a mode in which the vehicle driven by the driver in person is traveling on a straight road, the control unit may calculate a wheel alignment change angle through a trigonometric function operation based on a distance by which the vehicle moves for a preset time and a distance by which the vehicle leans to any one side from the current position, and compensate for steering based on the wheel alignment change angle, or forcibly stop the SCC or LKAS operation or forbid an entry of the SCC or LKAS.

In another embodiment, a method for determining a wheel alignment change of a vehicle may include: checking, by a control unit, whether the vehicle is traveling in an LKAS control mode, an active mode of an LKAS or a passive mode of the LKAS; checking, by the control unit, whether a wheel alignment change is likely to occur in each of the modes, when the vehicle is traveling on a straight road; detecting, by the control unit, a distance by which the vehicle moves for a preset time and a distance by which the vehicle leans to any one side from the current position; calculating, by the control unit, a wheel alignment change angle through a trigonometric function operation based on the moving distance of the vehicle and the distance by which the vehicle leans to any one side from the current position; and determining, by the control unit, whether the wheel alignment change angle falls within a steering compensation range, and compensating for steering or forcibly stopping the SCC or LKAS operation or forbidding an entry of the SCC or LKAS.

In order to determine the wheel alignment change angle of the vehicle, the control unit or the driver may measure a distance by which the vehicle moves at the current position of the road for a preset time without an additional operation of the steering wheel by the control unit or a driver and a lateral movement caused by the wheel alignment change of the vehicle, using one or more of a radar sensor, a camera sensor and a vehicle sensor, and then perform a trigonometric function operation, when the vehicle travels on the straight road.

When the vehicle is not traveling in the LKAS control mode or traveling in the active mode of the LKAS, the control unit may determine that a wheel alignment change is likely to occur when a current steering angle δ is 0 within the margin of error, a change |Δδ| of the steering angle falls within a first value $\varepsilon_{th1}$, and the magnitude |γ̇| of a yaw rate is equal to or more than a second value $\varepsilon_{th2}$, or when the magnitude |γ̇| of the current yaw rate is 0 within the margin of error and the change |Δδ| of the steering angle is equal to or more than a third value $\varepsilon_{th3}$.

When the vehicle is traveling in the passive mode of the LKAS, the control unit may detect an additional steering torque applied to steer the vehicle in the opposite direction to the wheel alignment change and cycle information of a time required for periodically repeating steering operations in the opposite direction to the wheel alignment change in order to correct the wheel alignment change, and determine that a wheel alignment change is likely to occur when the additional steering torque and the cycle are equal to or more than preset values.

When the wheel alignment change is likely to occur, the control unit may determine whether the road on which the vehicle is traveling is a straight road or curved road, using arrangement information of surrounding stationary objects acquired through a radar sensor for a preset time.

DESCRIPTION OF SPECIFIC EMBODIMENTS

Hereafter, embodiments of the present invention will be described in detail with reference to the accompanying drawings.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
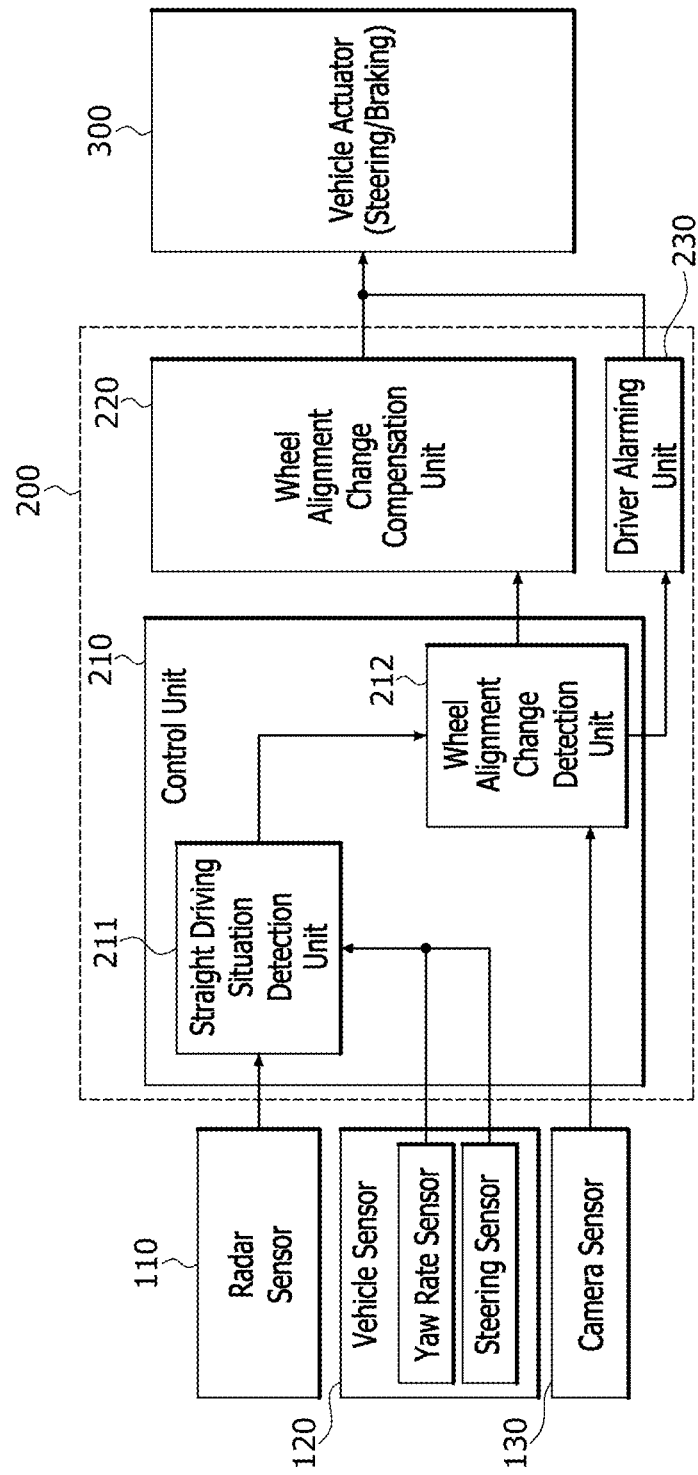
FIG. 1 is a diagram illustrating a schematic configuration of an apparatus for determining a wheel alignment change of a vehicle in accordance with an embodiment of the present invention.

FIG. 1 is a diagram illustrating a schematic configuration of an apparatus for determining a wheel alignment change of a vehicle in accordance with an embodiment of the present invention.

As illustrated in FIG. 1, the apparatus 200 for determining a wheel alignment change of a vehicle in accordance with the embodiment of the present invention may detect a wheel alignment change using sensing information detected from sensors 110 to 130 which are already mounted in a vehicle having the SCC (Smart Cruise Control) or LKAS (Lane Keep Assist System) function applied thereto, and control a vehicle actuator 300 (for example, steering or braking) by performing correction or compensation depending on the wheel alignment change, or alarm a driver or forcibly stop the system operation for the sake of vehicle safety, when the wheel alignment change exceeds the correction range. The apparatus 200 may include a control unit 210, a wheel alignment change compensation unit 220 and a driver alarming unit 230.

Although not illustrated in detail in FIG. 1, the control unit 210, the wheel alignment change compensation unit 220 and the driver alarming unit 230 may be implemented with one or more processors.

The control unit 210 may include a straight driving situation detection unit 211 and a wheel alignment change detection unit 212.

The sensors 110 to 130 may include a radar sensor 110, a vehicle sensor (for example, a steering angle sensor and yaw rate sensor) 120 and a camera sensor 130.

The straight driving situation detection unit 211 may detect whether the vehicle is going straight, based on information on the positions of objects on the road, acquired from the radar sensor 110, and a yaw rate and steering angle acquired from the vehicle sensor 120 mounted in the vehicle, for example, the steering angle sensor and the yaw rate sensor.

The straight driving situation detection unit 211 may output the information on whether the vehicle is going straight or not.

When the information outputted from the straight driving situation detection unit 211 indicates that the vehicle is going straight, the wheel alignment change detection unit 212 may detect a wheel alignment change (or angle) based on lane information acquired from the camera sensor 130.

For example, when a driver is intended to drive straight on a straight road with the wheel alignment of the vehicle changed, the driver may steer the vehicle at an angle corresponding to the wheel alignment change in the opposite direction to the wheel alignment change. In this case, the yaw rate sensor may output a value of 0 deg/s indicating the straight driving situation within the margin of error, and the steering angle sensor may output a value corresponding to the wheel alignment change (or angle). Thus, the wheel alignment change detection unit 212 may detect the wheel alignment change (or angle) based on the output values.

However, when an error occurred in the yaw rate sensor, the yaw rate sensor may output the value indicating the straight driving situation even though the vehicle is traveling on a curved road. In the present embodiment, the apparatus 200 may verify whether the state of the yaw rate sensor is normal, by secondarily utilizing arrangement information on surrounding objects (for example, street trees, road boundary stones and road fences), acquired from the radar sensor (refer to FIGS. 2A and 2B). The arrangement information may include an arrangement interval and arrangement angle.

The wheel alignment change detection unit 212 may output the detected wheel alignment change (or angle).

The driver alarming unit 230 may output an alarm to the driver when the detected wheel alignment change is larger than a preset threshold value (or reference value). That is, the driver alarming unit 230 may output an alarm to the driver through a vehicle actuator 300 or an output device (for example, AVN) mounted on the vehicle.

The wheel alignment change compensation unit 220 may perform correction or compensation for SCC or LKAS control depending on the wheel alignment change deviation.

For example, when the detected wheel alignment change is equal to or less than the preset threshold value (or reference value), the wheel alignment change compensation unit 220 may perform correction by the detected wheel alignment change (or angle) and output the correction result to the vehicle actuator 300 (for example, steering or braking). On the other hand, when the detected wheel alignment change exceeds the preset threshold value (or reference value), the control unit 210 may output a wheel alignment change threshold exceeding signal to the driver alarming unit 230 to alarm the driver or forcibly stop the system operation (for example, SCC or LKAS operation), for the sake of vehicle safety.

Figure 2A:
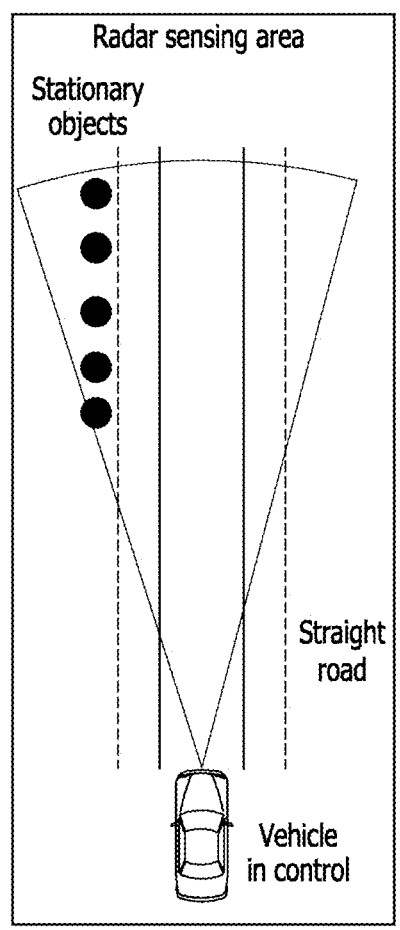
FIGS. 2A to 2C are diagrams for describing a method for detecting a wheel alignment change using a vehicle sensor when the vehicle travels, in FIG. 1.
Figure 2B:
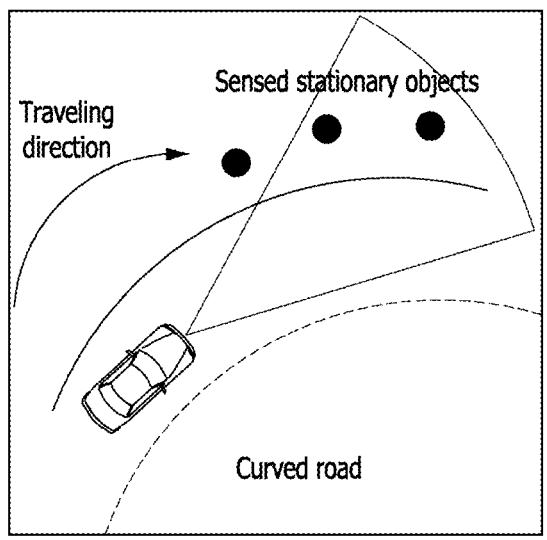
Figure 2C:
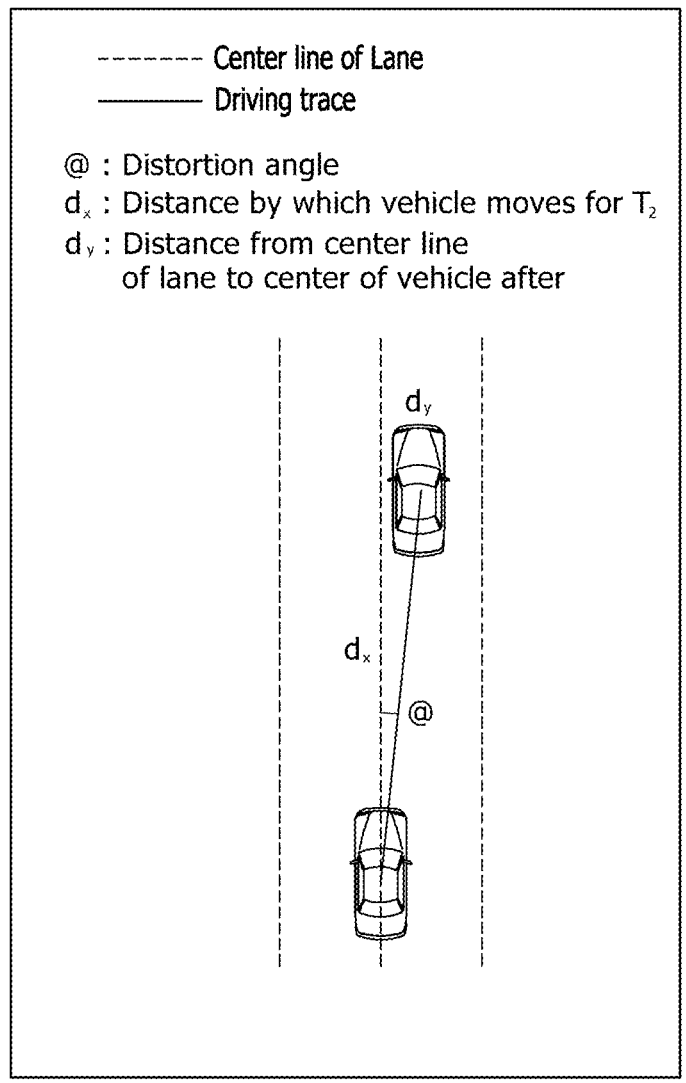

FIGS. 2A to 2C are diagrams illustrating a method for detecting a wheel alignment change using the vehicle sensor when the vehicle travels, in FIG. 1.

FIG. 2A is a diagram illustrating that the yaw rate sensor outputs the value of 0 deg/s indicating the straight driving situation with the margin of error when the vehicle is traveling on a straight road, and the control unit verifies whether the vehicle is normally traveling on the straight road, by secondarily using arrangement information (for example, arrangement interval and angle) on surrounding objects such as street trees, road boundary stones and road fences, the arrangement information being acquired through the radar sensor.

FIG. 2B is a diagram illustrating that the yaw rate sensor outputs a value of x deg/s indicating a curved driving situation with the margin of error when the vehicle is traveling on a curved road, and the control unit verifies whether the vehicle is normally traveling on the curved road, by secondarily using arrangement information (for example, arrangement interval and angle) on surrounding objects such as street trees, road boundary stones and road fences, the arrangement information being acquired through the radar sensor.

When checking that the vehicle is going straight, through the above-described principle, the control unit 210 may estimate whether the vehicle leans to the left or right side of the road, by additionally using lane information acquired from the camera sensor 130.

FIG. 2C illustrates that a vehicle deviates from the road center, that is, a vehicle of which the wheels are out of alignment deviates from the road center and leans to one side of the road even though the steering angle is 0, while the vehicle travels on a straight road or particularly while the vehicle is operated through a related system (for example, LKAS) without a driver's operation. In this case, the control unit 210 may determine a wheel alignment change (or angle) @ based on a driving torque variation (for example, a torque generated when steering is controlled in the opposite direction to the wheel alignment change), a duration time (for example, a traveling time required for determining a moving distance with time), a moving distance (for example, a moving distance with time), and a distance by which the vehicle deviates from the road center.

That is, the control unit 210 may determine the center of the vehicle through the left/right lane information of the road, detect a driving trace of the vehicle from the center of the vehicle for a predetermined time, and detect how much the vehicle deviates from the center of the road, in order to calculate the wheel alignment change of the vehicle.

At this time, the control unit 210 may determine whether the calculated wheel alignment change has an influence on the stability of the vehicle, and then perform correction control during the subsequent driving cycle (before engine off), in case that the correction control is available. When determining that the wheel alignment change has a significant influence on the driving stability of the vehicle, the control unit 210 may send a signal for requesting wheel alignment correction to the driver, and then stop the SCC/LKAS control.

The present embodiment may be based on the supposition that the vehicle is automatically driven straight along the center of the road. However, when the driver drives the vehicle in person, the vehicle may not be necessarily driven along the center of the road, but driven straight at the position where the vehicle leans to one side of the road by a predetermined distance, depending on the driver's driving habit. Therefore, when the wheel alignment angle is calculated in FIG. 2C, the current position may not correspond to the center of the road.

Figure 3:
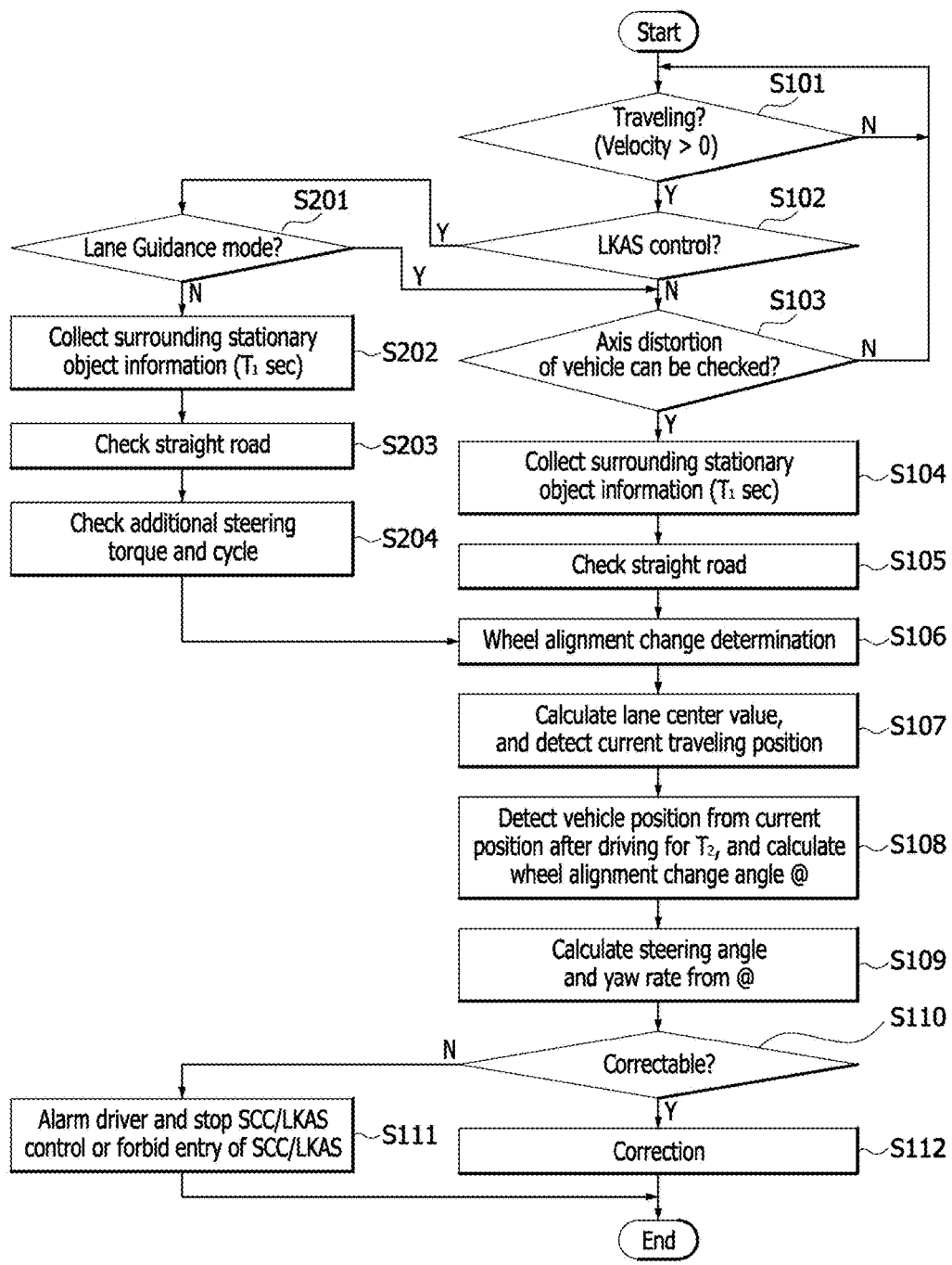
FIG. 3 is a flowchart for describing a method for determining a wheel alignment change of a vehicle in accordance with an embodiment of the present invention.

FIG. 3 is a flowchart for describing a method for determining a wheel alignment change of a vehicle in accordance with an embodiment of the present invention.

As illustrated in FIG. 3, the control unit 210 may determine whether the vehicle is traveling, at step S101.

For example, when the velocity of the vehicle is higher than 0, the control unit 210 may determine that the vehicle is traveling.

When the determination result indicates that the vehicle is traveling (Yes at step S101), the control unit 210 may determine whether the vehicle is controlled by the LKAS, at step S102.

When the determination result indicates that the vehicle is controlled by the LKAS (Yes at step S102), the control unit 210 may determine whether a lane guidance mode is being executed, at step S201.

Then, when the vehicle is not controlled by the LKAS (No at step S102) (for example, the driver drives the vehicle in person) or when the lane guidance mode is being executed (Yes at step S201), the control unit 210 may determine whether a vehicle axis distortion can be checked or a wheel alignment change can be checked, at step S103. The lane guidance mode may indicate an active mode of the LKAS, and enable the vehicle to autonomously drive along the road center.

Specifically, the control unit 210 may determine whether an axis distortion occurs because the magnitude $|\dot{\gamma}|$ of the yaw rate is equal to or more than a second value $\varepsilon_{th2}$ while the current steering angle $\delta$ is 0 within the margin of error ($\delta=0$) and a change $|\Delta\delta|$ of the steering angle falls within a first value $\varepsilon_{th1}$, that is, whether the vehicle is driven in a lateral direction even though an input of the steering wheel is straight. On the other hand, the control unit 210 may determine whether an axis distortion occurs because a change $|\Delta\delta|$ of the steering angle is equal to or more than a third value $\varepsilon_{th3}$ while the magnitude $|\gamma|$ of the current yaw rate is 0 within the margin of error ($|\gamma|\approx 0$), that is, whether a steering wheel input continuously occurs even though the vehicle is going straight.

When the determination result indicates that an axis distortion of the vehicle can be checked (Yes at step S103), the control unit 210 may collect information on surrounding stationary objects through the radar sensor for a preset time (for example, $T_1$).

The control unit 210 may check whether the corresponding road is a straight road, using the information collected through the radar sensor, at step S105.

Furthermore, when the vehicle is being controlled by the LKAS (Yes at step S102) but the lane guidance mode is not executed (No at step S201), for example, when the mode in which the vehicle autonomously drives so as not to swerve from the road is being executed as a passive mode of the LKAS, the control unit 210 may collect information on surrounding stationary objects through the radar sensor for the preset time T1 at step S202, check whether the corresponding road is a straight road, using the information collected through the radar sensor, at step S203, and check (detect) an additional steering torque and a cycle at step S204. The additional steering torque may indicate a torque for steering the vehicle in the opposite direction to the wheel alignment change, and the cycle may indicate a time required for repeating steering operations in the opposite direction to the wheel alignment change in order to correct the wheel alignment change.

When the road is a straight road and the wheel alignment change can be checked, the control unit 210 may start wheel alignment change (or distortion angle) determination at step S106.

When the wheel alignment change (or deviation angle) determination is started, the control unit 210 may calculate a lane center value (or road center value) and detect the current traveling position, at step S107.

In order to detect the current traveling position, the control unit 210 may detect the vehicle position from the current position after the vehicle travels for a preset time $T_2$, and then calculate a wheel alignment change angle @ at step S108 (refer to FIG. 2C).

For example, in order to determine the wheel alignment change angle @ of the vehicle with reference to FIG. 2C, the control unit 210 may measure a distance $d_x$ of the vehicle which moves along the road center for a predetermined time without an additional input (or additional operation of the steering wheel) and a lateral movement $d_y$ caused by the wheel alignment change of the vehicle, using the radar sensor, the camera sensor and the vehicle sensor, when the vehicle travels on the straight road. Then, the control unit 210 may perform a trigonometric function operation (for example, $d_y/d_x$=tan @).

Then, the control unit 210 may calculate a steering angle and yaw rate which need to be compensated for, from the wheel alignment change angle @, at step S109.

When the calculation result of step S109 indicates that the steering angle and yaw rate can be compensated for or corrected from a preset reference value (Yes at step S110), the control unit 210 may perform compensation or correction through the wheel alignment change compensation unit 220, at step S112. At this time, the correction method is not limited to a specific method, but may include publicly known techniques.

However, when the calculation result of step S109 indicates that the steering angle and the yaw rate cannot be compensated for or corrected from the preset reference value (No at step S110), the control unit 210 may output an alarm to the driver or forcibly stop the system operation (for example, SCC or LKAS operation) and forbid an entry of the SCC or LKAS, for the sake of vehicle safety, at step S111.

In the present embodiment, the apparatus and method can detect a wheel alignment change and correct the wheel alignment change. Then, when the correction is not possible, the apparatus and method can output an alarm to a user or forcibly stop the SCC or LKAS operation. However, even when the vehicle is driven in an undesired direction due to a tire pressure difference or cross-wind even though the wheels of the vehicle are not out of alignment, the apparatus and method may forcibly stop the SCC or LKAS operation and forbid an entry (operation) of the SCC or LKAS.

In accordance with the embodiment of the present invention, the apparatus and method can determine and correct a wheel alignment change of the vehicle or forcibly stop the system operation, using the environmental sensor mounted on the SCC or LKAS without additional sensors, thereby securing the stability of the vehicle.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An apparatus for determining a wheel alignment change of a vehicle, comprising:
    a straight driving situation detection unit configured to detect whether a vehicle is going straight, based on information on positions of objects on a road, acquired from a radar sensor of the vehicle, and a yaw rate and a steering angle acquired from a vehicle sensor mounted in the vehicle, the vehicle sensor comprising a yaw rate sensor;
    a wheel alignment change detection unit configured to detect a wheel alignment change based on lane information acquired from a camera sensor of the vehicle, when vehicle information detected by the straight driving situation detection unit indicates that the vehicle is going straight;
    a driver alarming unit configured to output an alarm to a driver when the detected wheel alignment change is larger than a preset threshold value; and
    a wheel alignment change compensation unit configured to compensate for steering for SCC (Smart Cruise Control) or LKAS (Lane Keep Assist System) control, when the detected wheel alignment change is smaller than the threshold value,
    wherein the straight driving situation detection unit and the wheel alignment change detection unit are integrated into a control unit, and the control unit verifies whether state of the yaw rate sensor is normal, by determining whether the road on which the vehicle is traveling is a straight road or curved road, using surrounding object arrangement information acquired from the radar sensor,
    wherein when a wheel alignment change is likely to occur in the corresponding mode among an active mode of the LKAS, a passive mode of the LKAS and a mode in which the vehicle driven by the driver in person is traveling on a straight road, the control unit calculates a wheel alignment change angle through a trigonometric function operation based on a distance by which the vehicle moves for a preset time and a distance by which the vehicle leans to any one side from the current position, and compensates for steering based on the wheel alignment change angle, or forcibly stops the SCC or LKAS operation or forbids an entry of the SCC or LKAS.

2. The apparatus of claim 1, wherein the vehicle sensor comprises a steering angle sensor.

3. The apparatus of claim 1, wherein when the wheel alignment change is equal to or less than the threshold value, the control unit compensates for steering by the wheel alignment change through the wheel alignment change compensation unit, and outputs the compensation result to a vehicle actuator, and when the wheel alignment change exceeds the threshold value, the control unit outputs a wheel alignment change threshold exceeding signal to the driver alarming unit to alarm the driver, or forcibly stops the SCC or LKAS operation or forbids an entry of the SCC or LKAS.

4. A method for determining a wheel alignment change of a vehicle, comprising:

checking, by a control unit, whether the vehicle is traveling in an LKAS control mode, an active mode of an LKAS or a passive mode of the LKAS;

checking, by the control unit, whether a wheel alignment change is likely to occur in each of the modes, when the vehicle is traveling on a straight road;

detecting, by the control unit, a distance by which the vehicle moves for a preset time and a distance by which the vehicle leans to any one side from the current position;

calculating, by the control unit, a wheel alignment change angle through a trigonometric function operation based on the moving distance of the vehicle and the distance by which the vehicle leans to any one side from the current position; and determining, by the control unit, whether the wheel alignment change angle falls within a steering compensation range, and compensating for steering or forcibly stopping the SCC or LKAS operation or forbidding an entry of the SCC or LKAS.

5. The method of claim 4, wherein in order to determine the wheel alignment change angle of the vehicle, the control unit or the driver measures a distance by which the vehicle moves at the current position of the road for a preset time without an additional operation of the steering wheel by the control unit or a driver and a lateral movement caused by the wheel alignment change of the vehicle, using one or more of a radar sensor, a camera sensor and a vehicle sensor, and then performs a trigonometric function operation, when the vehicle travels on the straight road.

6. The method of claim 4, wherein when the vehicle is not traveling in the LKAS control mode or traveling in the active mode of the LKAS, the control unit determines that a wheel alignment change is likely to occur when a current steering angle $\delta$ is 0 within the margin of error, a change $|\Delta\delta|$ of the steering angle falls within a first value $\varepsilon_{th1}$, and the magnitude $|\dot{\gamma}|$ of a yaw rate is equal to or more than a second value $\varepsilon_{th2}$, or when the magnitude $|\dot{\gamma}|$ of the current yaw rate is 0 within the margin of error and the change $|\Delta\delta|$ of the steering angle is equal to or more than a third value $\varepsilon_{th3}$.

7. The method of claim 6, wherein when the wheel alignment change is likely to occur, the control unit determines whether the road on which the vehicle is traveling is a straight road or curved road, using arrangement information of surrounding stationary objects acquired through a radar sensor for a preset time.

8. The method of claim 4, wherein when the vehicle is traveling in the passive mode of the LKAS, the control unit detects an additional steering torque applied to steer the vehicle in the opposite direction to the wheel alignment change and cycle information of a time required for periodically repeating steering operations in the opposite direction to the wheel alignment change in order to correct the wheel alignment change, and determines that a wheel alignment change is likely to occur when the additional steering torque and the cycle are equal to or more than preset values.

* * * * *